US012080468B2

(12) United States Patent
Park et al.

(10) Patent No.: US 12,080,468 B2
(45) Date of Patent: Sep. 3, 2024

(54) COIL COMPONENT

(71) Applicant: SAMSUNG ELECTRO-MECHANICS CO., LTD., Suwon-si (KR)

(72) Inventors: Ji Young Park, Suwon-si (KR); Myoung Soon Park, Suwon-si (KR); Sung Hee Kim, Suwon-si (KR); Han Kyeol Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 760 days.

(21) Appl. No.: 17/164,034

(22) Filed: Feb. 1, 2021

(65) Prior Publication Data

US 2022/0172885 A1 Jun. 2, 2022

(30) Foreign Application Priority Data

Nov. 27, 2020 (KR) ........................ 10-2020-0162898

(51) Int. Cl.
*H01F 27/29* (2006.01)
*H01F 17/00* (2006.01)
*H01F 27/32* (2006.01)

(52) U.S. Cl.
CPC ....... *H01F 27/292* (2013.01); *H01F 17/0013* (2013.01); *H01F 27/324* (2013.01)

(58) Field of Classification Search
CPC ... H01F 27/292; H01F 17/0013; H01F 27/324
See application file for complete search history.

(56) References Cited

U.S. PATENT DOCUMENTS

2016/0351316 A1* 12/2016 Ohkubo ................ H01F 27/325
2017/0169933 A1* 6/2017 Kim ........................ H01F 17/04
2017/0330674 A1* 11/2017 Lee ..................... H01F 17/0013
2017/0372833 A1* 12/2017 Jang ......................... H01F 17/04
2018/0033539 A1* 2/2018 Yoon ................... H01F 27/2804
2018/0374627 A1* 12/2018 Ryu ........................ H01F 17/04
(Continued)

FOREIGN PATENT DOCUMENTS

KR 20170090729 A * 8/2017 ............. H01F 17/00
KR 10-2020-0107210 A 9/2020
KR 10-2022-0028592 A 3/2022

*Primary Examiner* — Malcolm Barnes
(74) *Attorney, Agent, or Firm* — Morgan, Lewis & Bockius LLP

(57) ABSTRACT

A coil component includes a support substrate disposed in the body, a coil portion disposed on the support substrate and comprising first, second, third and fourth coil layers spaced apart from each other, and a first external electrode and a second external electrode disposed to be spaced apart from each other on the body and connected to the first and fourth coil layers, respectively. Each of the second and third coil layers comprises a first metal layer, disposed on the support substrate, and a second metal layer disposed on the first metal layer to cover a side surface of the first metal layer and to be in contact with the support substrate. The second coil layer has a first bridge pattern exposed to a first side surface of two side surfaces, opposing each other, of the body. The third coil layer has a second bridge pattern exposed to a second side surface of the two side surfaces of the body.

17 Claims, 7 Drawing Sheets

(56) References Cited

U.S. PATENT DOCUMENTS

| | | | | |
|---|---|---|---|---|
| 2019/0180928 | A1* | 6/2019 | Lee | H01F 27/24 |
| 2019/0198216 | A1* | 6/2019 | Lee | H01F 41/046 |
| 2019/0267182 | A1* | 8/2019 | Lee | H01F 17/04 |
| 2019/0311830 | A1* | 10/2019 | Kim | H01F 27/324 |
| 2020/0279687 | A1* | 9/2020 | Koo | H01F 17/04 |
| 2020/0286677 | A1 | 9/2020 | Lee et al. | |

* cited by examiner

COIL COMPONENT

CROSS-REFERENCE TO RELATED APPLICATION (S)

The present application claims the benefit of priority to Korean Patent Application No. 10-2020-0162898, filed on Nov. 27, 2020 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices, along with a resistor and a capacitor.

As electronic devices gradually gain higher performance and become smaller, coil components used in the electronic devices have been miniaturized. However, characteristics such as inductance, and the like, of individual coil components are required to have the same as or a higher level than electronic components according to the related art.

SUMMARY

An aspect of the present disclosure is to provide a coil component including a plurality of coil layers. In the coil component, a total volume of the coil layers, that are conductors, may be increased.

According to an aspect of the present disclosure, a coil component includes a body, a support substrate disposed in the body, a coil portion disposed on the support substrate and comprising first, second, third and fourth coil layers spaced apart from each other, and a first external electrode and a second external electrode disposed to be spaced apart from each other on the body and connected to the first and fourth coil layers, respectively. Each of the second and third coil layers comprises a first metal layer, disposed on the support substrate, and a second metal layer disposed on the first metal layer to cover a side surface of the first metal layer and to be in contact with the support substrate. The second coil layer has a first bridge pattern exposed to a first side surface of two side surfaces, opposing each other, of the body. The third coil layer has a second bridge pattern exposed to a second side surface of the two side surfaces of the body.

According to another aspect of the present disclosure, a coil component includes a body comprising first and second surfaces opposing each other in a length direction, third and fourth surfaces connecting the first and second surfaces and opposing each other in a width direction, and fifth and sixth surfaces connecting the first to fourth surfaces and opposing each other in a thickness direction; a support substrate disposed in the body; a coil portion disposed on the support substrate and comprising first, second, third and fourth coil layers spaced apart from each other in the thickness direction; and a first external electrode and a second external electrode disposed to be spaced apart from each other on the body and connected to the first and fourth coil layers, respectively. Each of the second and third coil layers comprises multiple metal layers stacked on one another. External end portions of the first and fourth coil layers are exposed to the first and second surfaces of the body, respectively, in the length direction. The second coil layer has a first bridge pattern extending from an external end portion of the second coil layer, the first bridge pattern being exposed through the third surface of the body in the width direction. The third coil layer has a second bridge pattern extending from an external end portion of the third coil layer, the second bridge pattern being exposed through the fourth surface of the body in the width direction.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
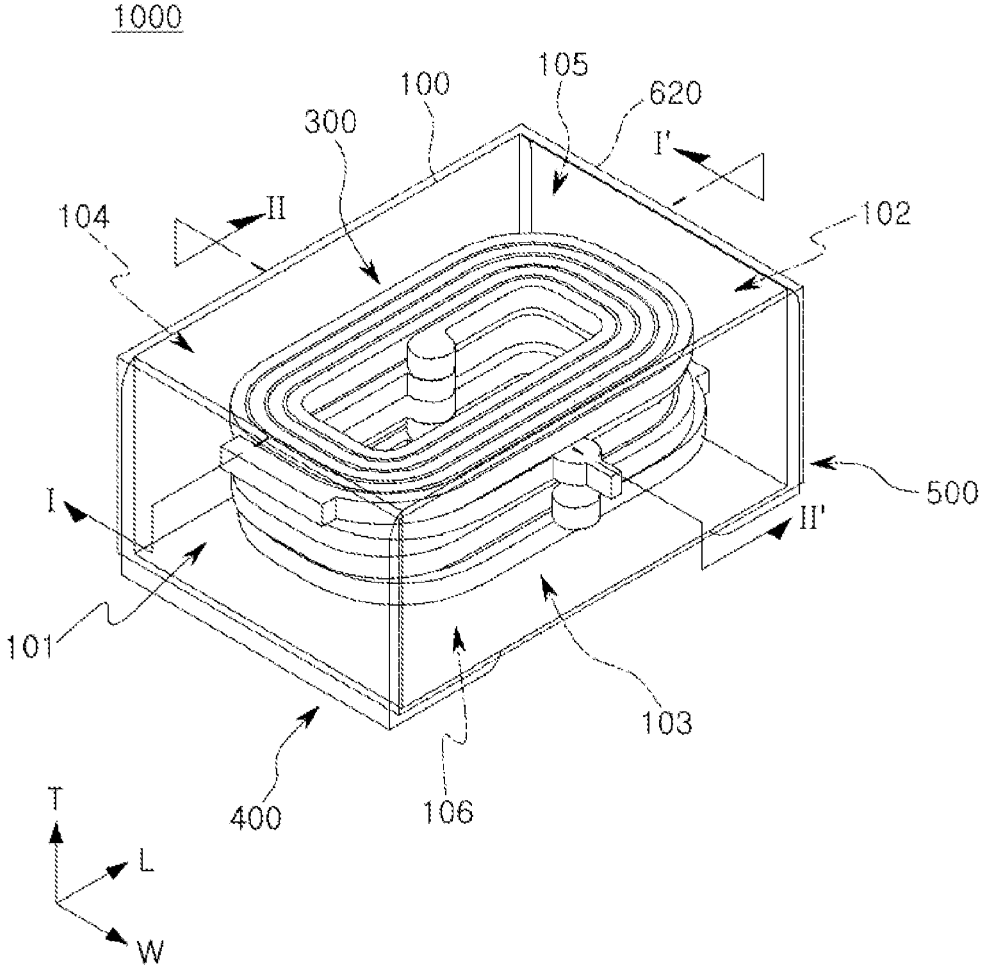
FIG. 1 is a schematic perspective view of a coil component according to an exemplary embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a direction of gravity.

Terms such as "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an exemplary embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

Figure 2:
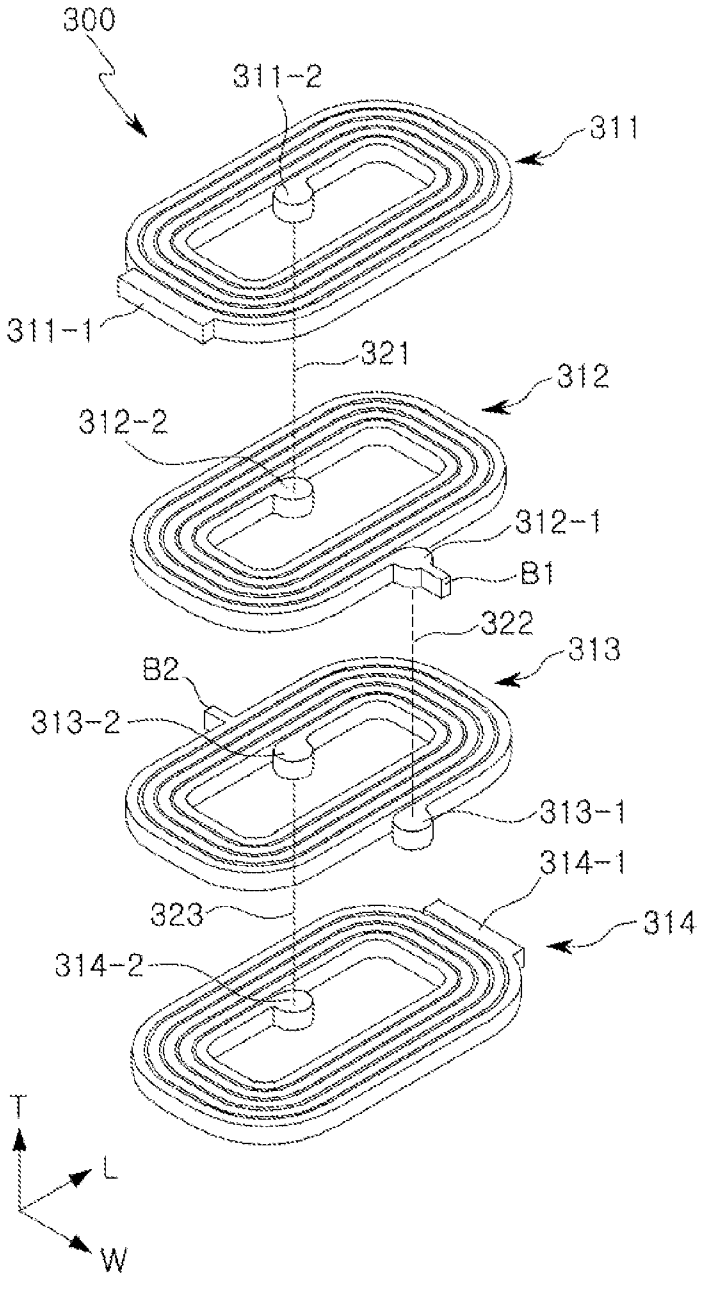
FIG. 2 is a schematic exploded view of a coil portion of FIG. 1.
Figure 3:
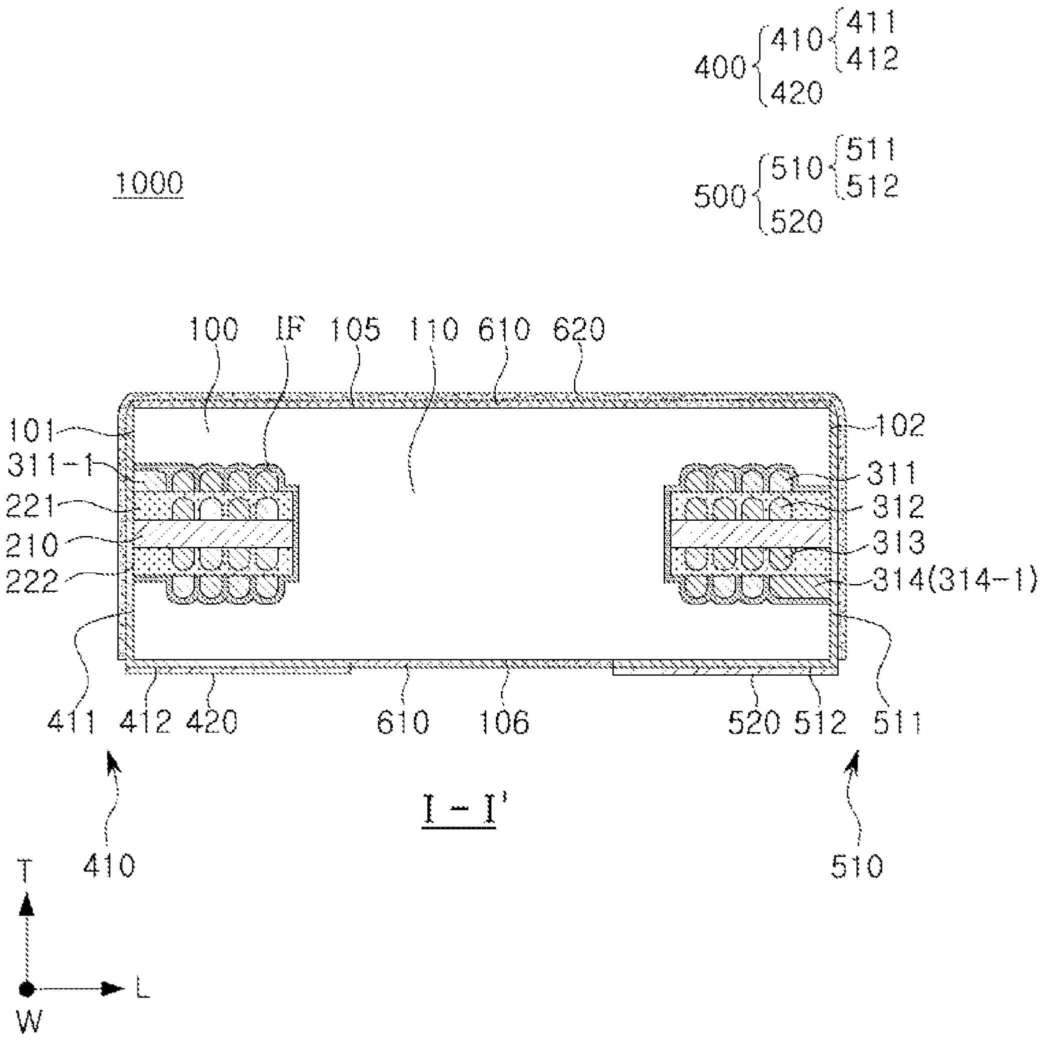
FIG. 3 is a cross-sectional view taken along line I-I' of FIG. 1.
Figure 4:
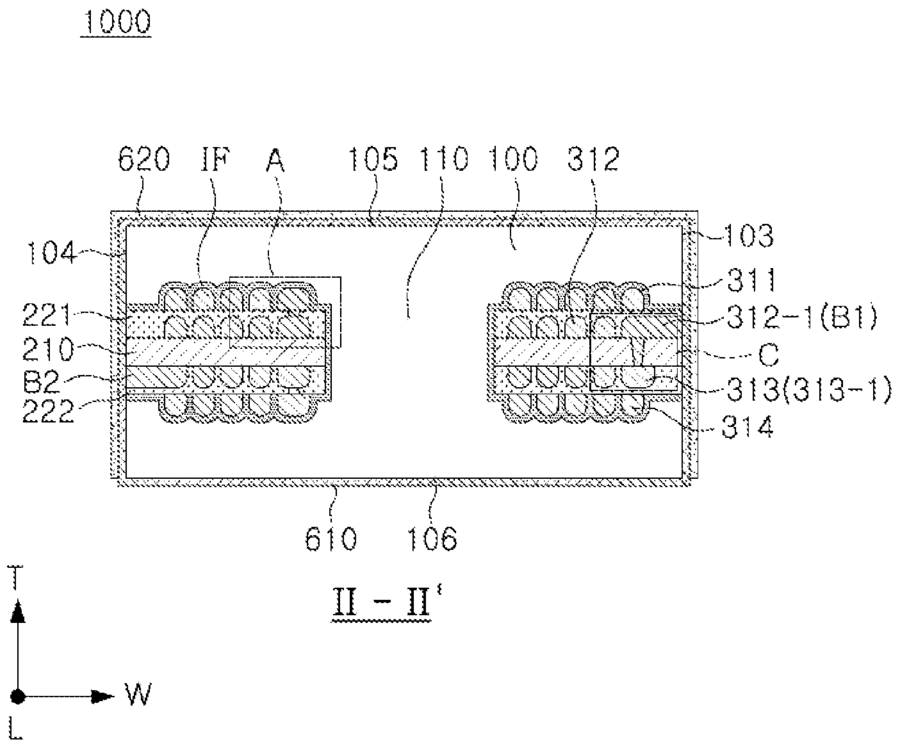
FIG. 4 is a cross-sectional view taken along line II-II' of FIG. 1.
Figure 5:
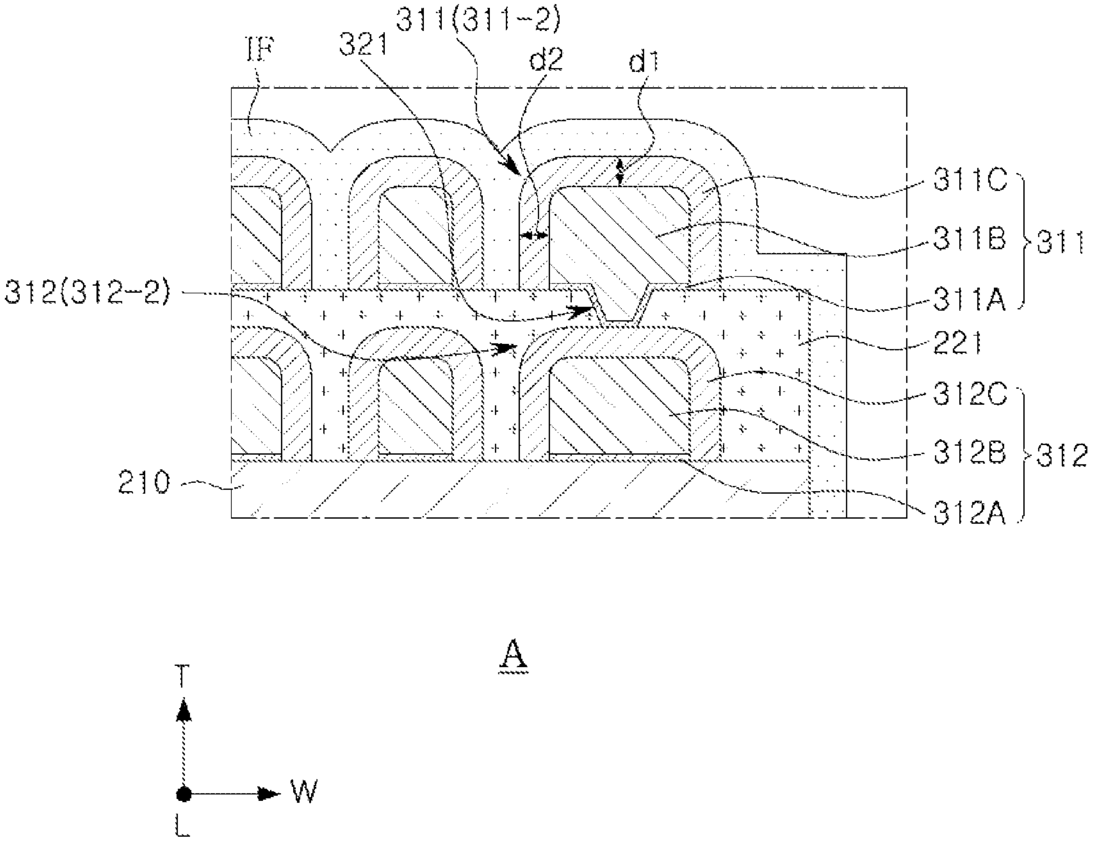
FIG. 5 is an enlarged view of portion 'A' of FIG. 4.
Figure 6:
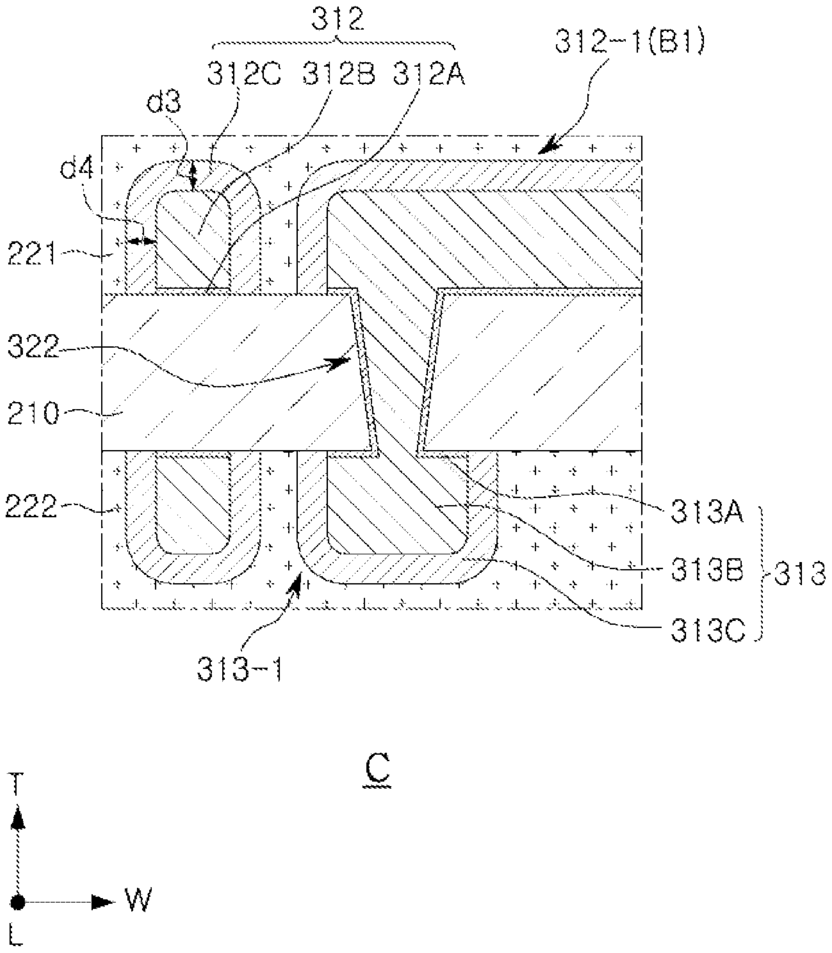
FIG. 6 is an enlarged view of portion 'B' of FIG. 4.
Figure 7:
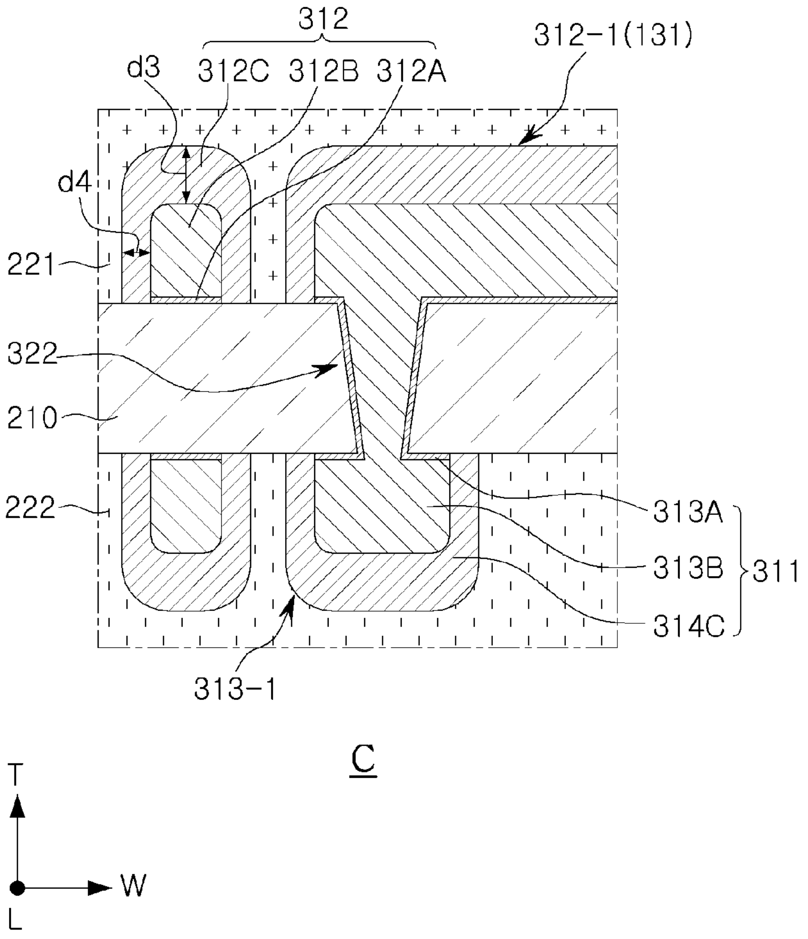
FIG. 7 is an enlarged view of portion 'B' of a coil component according to another exemplary embodiment of the present disclosure.

FIG. 1 is a schematic perspective view of a coil component according to an exemplary embodiment. FIG. 2 is a schematic exploded view of a coil portion of FIG. 1. FIG. 3 is a cross-sectional view taken along line I-I' of FIG. 1, and FIG. 4 is a cross-sectional view taken along line II-II' of FIG. 1. FIG. 5 is an enlarged view of portion 'A' of FIG. 4, and FIG. 6 is an enlarged view of portion 'B' of FIG. 4. FIG. 7 is an enlarged view of portion 'B' of a coil component according to another exemplary embodiment of the present disclosure. In FIG. 1, a support substrate and insulating layers are omitted to illustrate an internal structure of the coil portion.

Referring to FIGS. 1 to 6, a coil component 1000 according to an exemplary embodiment may include a body 100, a support substrate 210, a coil portion 300, insulating layer 221 and 222, external electrodes 400 and 50, and an insulating layer IF. The coil component 1000 may further include a surface insulating layer 600.

The body 100 may form an exterior of the coil component 1000, and may embed the coil portion 300 therein.

The body 100 may be formed to have a hexahedral shape overall.

Hereinafter, an exemplary embodiment will be described in the case that the body 100 has a hexahedral shape. However, such a description does not exclude a coil component, including a body formed to have another shape, other than the hexahedral shape, from the scope of the present disclosure.

Referring to FIGS. 1, 3, and 4, the body 100 has a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may correspond to a wall surface of the body 100 connecting the fifth surface 101 and the sixth surface 106 of the body 100. Hereinafter, both end surfaces (one end surface and the other end surface) of the body 100 may refer to the first surface 101 and the second surface 102 of the body 100, respectively, both side surfaces (one side surface and the other side surface) of the body 100 may refer to the third surface 103 and the fourth surface 104, respectively. In addition, one surface and the other surface of the body 100 may refer to the sixth surface 106 and the fifth surface 105 of the body 100, respectively. When mounting the coil component 1000 according to the present embodiment on a mounting board such as a printed circuit board (PCB), one surface 106 of the body 100 may be disposed to face a mounting surface of the mounting board to be mounted on the mounting board.

As an example, the body 100 may be formed in such a manner that the coil component 1000, including the external electrodes 400 and 500 and the surface insulating layer 600 to be described later, has a length of 2.0 mm, a width of 1.2 mm, and a thickness of 0.65 mm, but the present disclosure is not limited thereto.

As an example, the length of the coil component 1000 may refer to a maximum value, among lengths of a plurality of segments, connecting two outermost boundary lines opposing each other in a length (L) direction of the coil component 1000 and parallel to the length (L) direction of the coil component 1000, based on an optical microscope or scanning electron microscope (SEM) image for a cross section of the coil component 1000 in a length-thickness (L-T) direction in a central portion of the coil component 1000 in a width (W) direction. Alternatively, the length of the coil component 1000 may refer to a minimum value, among lengths of a plurality of segments connecting two outermost boundary lines opposing each other in the length (L) direction of the coil component 1000 illustrated in the cross-sectional image and parallel to the length (L) direction of the coil component 1000. Alternatively, the length of the coil component 1000 may refer to an arithmetic mean of at least two segments, among a plurality of segments connecting two outermost boundary lines opposing each other in the length (L) direction of the coil component 1000, illustrated in the cross-sectional image, and parallel to the length (L) direction of the coil component 1000.

The thickness of the coil component 1000 may refer to a maximum value, among lengths of a plurality of segments, connecting two outermost boundary lines opposing each other in a thickness (T) direction of the coil component 1000 and parallel to the thickness (T) direction of the coil component 1000, based on an optical microscope or scanning electron microscope (SEM) image for a cross section of the coil component 1000 in a length-thickness (L-T) direction in a central portion of the body 100 in a width (W) direction. Alternatively, the thickness of the coil component 1000 may refer to a minimum value, among lengths of a plurality of segments connecting two outermost boundary lines opposing each other in a thickness (T) direction of the coil component 1000 illustrated in the cross-sectional image and parallel to the thickness (T) direction of the coil component 1000. Alternatively, the thickness of the coil component 1000 may refer to an arithmetic mean of at least two segments, among a plurality of segments connecting two outermost boundary lines opposing each other in a thickness (T) direction of the coil component 1000, illustrated in the cross-sectional image, and parallel to the thickness (T) direction of the coil component 1000.

The width of the coil component 1000 may refer to a maximum value, among lengths of a plurality of segments, connecting two outermost boundary lines opposing each other in a width (W) direction of the coil component 1000 and parallel to the width (W) direction of the coil component 1000, based on an optical microscope or scanning electron microscope (SEM) image for a cross section of the coil component 1000 in a length-thickness (L-T) direction in a central portion of the body 100 in a width (W) direction. Alternatively, the width of the coil component 1000 may refer to a minimum value, among lengths of a plurality of segments connecting two outermost boundary lines opposing each other in a width (W) direction of the coil component 1000 illustrated in the cross-sectional image and parallel to the width (W) direction of the coil component 1000. Alternatively, the length of the coil component 1000 may refer to an arithmetic mean of at least two segments, among a plurality of segments connecting two outermost boundary lines opposing each other in a width (W) direction of the coil component 1000, illustrated in the cross-sectional image, and parallel to the width (W) direction of the coil component 1000.

Each of the length, the width, and the thickness of the coil component 1000 may be measured by a micrometer measurement method. In the micrometer measurement method, measurement may be performed may be measured by setting a zero point using a micrometer (instrument) with gage repeatability and reproducibility (R&R), inserting the coil component 1000 inserted between tips of the micrometer, and turning a measurement lever of the micrometer. When the length of the coil component 1000 is measured by a micrometer measurement method, the length of the coil component 1000 may refer to a value measured once or an arithmetic mean of values measured multiple times. This may be equivalently applied to the width and the thickness of the coil component 1000.

The body 100 may include a magnetic material and a resin. Specifically, the body 100 may be formed by laminating at least one magnetic composite sheet in which a magnetic material is dispersed in a resin. However, the body 100 may have a structure, other than the structure in which a magnetic material is dispersed in a resin. For example, the body 100 may be formed of a magnetic material such as ferrite, or a non-magnetic material.

The magnetic material may be ferrite or magnetic metal powder particles.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu-Mb-based alloy powder, a Fe—Ni—Cr-based alloy powder, and a Fe—Cr—Al-based alloy powder.

The magnetic metal powder particle may be amorphous or crystalline. For example, the magnetic metal powder particle may be a Fe—Si—B—Cr-based amorphous alloy powder, but is not limited thereto.

Each of the magnetic metal powder particles 10 may have an average diameter of about 0.1 μm to 30 μm, but is not limited thereto.

The body 100 may include two or more types of magnetic metal powder particle dispersed in a resin. The term "different types of magnetic powder particle" means that the magnetic powder particles, dispersed in the resin, are distinguished from each other by at least one of average diameter, composition, crystallinity, and shape.

The resin may include epoxy, polyimide, liquid crystal polymer, or the like, in a single form or combined forms, but is not limited thereto.

The body 100 may include a core 110 penetrating through the coil portion 300 to be described later. The core 110 may be formed by filling a through-hole of the coil portion 300 with a magnetic composite sheet, but the present disclosure is not limited thereto.

The coil portion 300 may be disposed in the body 100 to express characteristics of the coil component 1000. For example, when the coil component 1000 of the present embodiment is used as a power inductor, the coil portion 300 may the coil portion 300 may be connected to each of the first and second external electrodes 610 and 620 to be described later and may store an electric field as a magnetic field to maintain an output voltage, serving to stabilize power of an electronic device.

The support substrate 210 may be disposed in the body 100, and may support the coil portion 300 to be described later.

The support substrate 210 may include an insulating material, for example, a thermosetting insulating resin such as an epoxy resin, a thermoplastic insulating resin such as polyimide, or a photosensitive insulating resin, or the support substrate 210 may include an insulating material in which a reinforcing material such as a glass fiber or an inorganic filler is impregnated with an insulating resin. For example, the support substrate 210 may include an insulating material such as a copper clad laminate (CCL), prepreg, Ajinomoto Build-up Film (ABF), FR-4, a bismaleimide triazine (BT) film, a photoimageable dielectric (PID) film, and the like, but are not limited thereto.

The inorganic filler may be at least one or more selected from the group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the support substrate 210 is formed of an insulating material including a reinforcing material, the support substrate 210 may provide more improved rigidity. When the support substrate 210 is formed of an insulating material including no glass fiber, the support substrate 210 is advantageous for thinning the entire coil portion 300 to reduce a thickness of a component. When the support substrate 210 is formed of an insulating material including a photosensitive insulating resin, the number of processes for forming the coil portion 300 may be decreased. Therefore, it may be advantageous in reducing production costs, and a fine hole may be processed.

The coil portion 300 may be disposed on the support substrate 210, and may include first to fourth coil layers 311, 312, 313, and 314 spaced apart from each other. Specifically, based on a direction of each of FIGS. 2 and 3, the coil portion 300 may include a first coil layer 311 disposed in an uppermost portion to be connected to the first external electrode 400 to be described later, a second coil layer 312 disposed below the first coil layer 311, and a third coil layer 313 disposed below the second coil layer 312, and a fourth coil layer 314 disposed below the third coil layer 313 to be disposed in a lowermost portion and to be connected to the second external electrode 500 to be described later. Each of the first to fourth layers 311, 312, 313, and 314 may have a shape of a planar spiral in which at least one turn is formed around the core 110. Hereinafter, a case in which the coil portion 300, applied to the present embodiment, includes a total of four coil layers 311, 312, 313, and 314, will be taken as an example, but the scope of the present embodiment is not limited thereto.

Based on direction of FIGS. 3 and 4, the second coil layer 312 may be disposed to be in contact with an upper surface of the support substrate 210. The third coil layer 313 may be disposed to be in contact with a lower surface of the support substrate 210. The first coil layer 311 may be disposed above the second coil layer 312. The fourth coil layer 314 may be disposed below the third coil layer 313. A first insulating layer 221 to be described later may be disposed on the upper surface of the support substrate 210 to cover the second coil layer 312. The first coil layer 311 may be disposed to be in contact with the first insulating layer 221. A second insulating layer 222 to be described later may disposed on the lower surface of the support substrate 210 to cover the third coil layer 313. The fourth coil layer 314 may be disposed to be in contact with the second insulating layer 222. An external end portion 311-1 of the first coil layer 311 may be exposed to the first surface 101 of the body 100 to be in contact with and connected to the first external electrode 400. An external end portion 314-1 of the fourth coil layer 314 may be exposed to the second surface 102 of the body 100 to be in contact with and connected to the second external electrode 500.

The coil portion 300 may further include a first via 321 penetrating through the first insulating layer 221 to be described later to connect an internal end portion 311-2 of the first coil layer 311 to an internal end portion 312-2 of the second coil portion 312, a second via 322 penetrating through the support substrate 210 to connect an external end portion 312-1 of the second coil layer 312 to an external end portion 313-1 of the third coil layer 313, and a third via 323 penetrating through the second insulating layer 222 to be described later to connect an internal end portion of the third coil layer 313 to an internal end portion 314-2 of the fourth coil layer 314. Each of the internal end portion 311-2 of the first coil layer 311 and the internal end portion 312-2 of the second coil layer 312, connected to the first via 321, the external end portion 312-1 of the second coil layer 312 and the external end portion 313-1 of the third coil layer 313, connected to the second via 322, and the internal end portion 313-2 of the third coil layer 313 and the internal end portion 314-2 of the fourth coil layer 314, connected to the third via 323, may be a via pad formed to have a diameter greater than a width of each turn of the coil layers 311, 312, 313, and 314 so as to secure reliability of connection to the vias 321, 322, and 323. Thus, the coil portion 300 may serve as a single coil connected, in series, between the first and second external electrodes 400 and 500 to be described later.

The first and fourth coil layers 311 and 314 may include a conductive thin film disposed on an insulating layer, a third metal layer disposed on the conductive thin film, and a fourth metal layer disposed on the third metal layer. Referring to FIG. 5, as an example, the first coil layer 311 may include a conductive thin film 311A disposed to be in contact with the first insulating layer 221, a third metal layer 311B disposed to be in contact with the conductive thin film 311A and spaced apart from the first insulating layer 221 by exposing a side surface of the conductive thin film 311A, and a fourth metal layer 311C disposed on the third metal layer 311B to cover a side surface of the third metal layer 311B and to be in contact with the first insulating layer 221. The first coil layer 311 may be formed by, based on a direction of FIG. 5, forming a thin film for forming a conductive thin film on an entire upper surface of the first insulating layer 221 (including an internal wall of a via hole formed in the first insulating layer 221 such that the first via 321 is disposed), forming a photoresist, having an opening corresponding to the third metal layer 311B, on the thin film, filling the opening of the photoresist with the third metal layer 311B, removing the photoresist, removing a certain region of the thin film, exposed outwardly because the third metal layer 311B is not formed thereon, to form the conductive thin film 311A, and performing lead-in wire plating on the conductive thin film 311A and an exposed surface of the third metal layer 311B to form the third metal layer 311C. Each of the third and fourth metal layers 311B and 311C may be an electroplating layer, and the conductive thin film 311A may be an electroless plating layer or a sputtered layer, but the present disclosure is not limited thereto. The conductive thin film 311A may include at least one of molybdenum (Mo), titanium (Ti), nickel (Ni), chromium (Cr), and copper (Cu), and may be formed to have a structure including at least one layer. Each of the third and fourth metal layers 311B and 311C may include at least one of molybdenum (Mo), titanium (Ti), nickel (Ni), chromium (Cr), and copper (Cu), and may be formed to have a structure including at least one layer. As an example, unlike the third metal layer 311B, the fourth metal layer 311C may be plated and grown without limitation of a plating resist, and may be an isotropic plating layer. In this case, thicknesses of the fourth metal layers 311C, grown from a side surface of the conductive thin film 311A, a side surface of the third metal layer 311B, and an upper surface of the third metal layer 311B, may be substantially the same. For example, as illustrated in FIG. 5, a dimension d1 of a region in the fourth metal layer 311C, disposed on an upper surface of the third metal layer 311B, in a thickness direction T may be substantially the same as a dimension d2 of a region in the fourth metal layer 311C, disposed on a side surface of the third metal layer 311B, in a width direction W. As another example, unlike the third metal layer 311B, the fourth metal layer 311C may be plated and grown without limitation of a plating resist, and may be an anisotropic plating layer. In this case, a thickness of the fourth metal layer 311C, grown from the side surface of the third metal layer 311B, may be significantly greater than a thickness of the fourth metal layer 311C grown from the upper surface of the third metal layer 311B. For example, unlike what is illustrated in FIG. 5, a dimension d1 of a region in the fourth metal layer 311*c*, disposed on the upper surface of the third metal layer 311B, in the thickness direction T may be significantly greater than a dimension d2 of a region in the fourth metal layer 311C, disposed on the side surface of the third metal layer 311B, in the width direction W. As another example, the fourth metal layer 311C may have a structure including at least one isotropic plating layer described above and at least one anisotropic plating layer described above. A process of forming the first and fourth coil layers 311 and 314 may be performed simultaneously on a side of an upper surface of the support substrate 210 and a side of a lower surface of the support substrate 210 in the state in which the insulating layers 221 and 222 are formed on both surface of the support substrate 210, respectively. Therefore, although not illustrated in the drawings, the fourth coil layer 314 may also have the above-described structure of the first coil layer 311 including the conductive thin film 311A, the third metal layer 311B, and the fourth metal layer 311C.

The second and third coil layers include a thin-film conductive layer disposed on the support substrate, a first metal layer disposed on the thin-film conductive layer, and a second metal layer disposed on the first metal layer. Referring to FIG. 6, as an example, the second coil layer 312 may include a conductive thin film 312A disposed to be in contact with the support substrate 210, a first metal layer 312B disposed to be in contact with the conductive thin film 312A and spaced apart from the support substrate 210 by exposing a side surface of the conductive thin film 312A, and a second metal layer 312C disposed on the first metal layer 312B to cover the first metal layer 312B and disposed to be in contact with the support substrate 210. The second coil layer 312 may be formed by, based on a direction of FIG. 6, forming a thin film for forming a conductive thin film on an entire upper surface of the support substrate 210

(including an internal wall of a via hole formed in the support substrate 210 such that the second via 322 is disposed), forming a photoresist, having an opening corresponding to the first metal layer 312B, on the thin film, filling the opening of the photoresist with the first metal layer 312B, removing the photoresist, removing a certain region of the thin film, exposed externally because the first metal layer 312B is not formed thereon, to form the conductive thin film 312A, and performing lead-in wire plating on the conductive thin film 312A and an exposed surface of the first metal layer 312B to form the second metal layer 312C. Each of the first and second metal layers 312B and 312C may be an electroplating layer, and the conductive thin film 312A may be an electroless plating layer or a sputtered layer, but the present disclosure is not limited thereto. The conductive thin film 312A may include at least one of molybdenum (Mo), titanium (Ti), nickel (Ni), chromium (Cr), and copper (Cu), and may be formed to have a structure including at least one layer. Each of the first and second metal layers 312B and 312C may include at least one of molybdenum (Mo), titanium (Ti), nickel (Ni), chromium (Cr), and copper (Cu), and may be formed to have a structure including at least one layer. As an example, unlike the first metal layer 312B, the second metal layer 312C may be plated and grown without limitation of a plating resist, and may be an isotropic plating layer. In this case, thicknesses of the second metal layers 312C, grown from a side surface of the conductive thin film 312A, a side surface of the first metal layer 312B, and an upper surface of the first metal layer 312B, may be substantially the same. For example, as illustrated in FIG. 6, a dimension d3 of a region in the second metal layer 312C, disposed on an upper surface of the first metal layer 312B, in a thickness direction T may be substantially the same as a dimension d4 of a region in the second metal layer 312C, disposed on a side surface of the first metal layer 312B, in a width direction W. As another example, unlike the first metal layer 312B, the second metal layer 312C may be plated and grown without limitation of a plating resist, and may be an anisotropic plating layer. In this case, a thickness of the second metal layer 312C, grown from the upper surface of the first metal layer 312B, may be significantly greater than a thickness of the second metal layer 312C grown from the side surface of the first metal layer 312B. For example, as illustrated in FIG. 7, unlike what is illustrated in FIG. 6, a dimension d3 of a region in the second metal layer 312*c*, disposed on the upper surface of the first metal layer 312B, in the thickness direction T may be significantly greater than a dimension d4 of a region in the second metal layer 312C, disposed on the side surface of the first metal layer 312B, in the width direction W. As another example, the second metal layer 312C may have a structure including at least one isotropic plating layer described above and at least one anisotropic plating layer described above.

A process of forming the second and third coil layers 312 and 313 may be performed simultaneously on both surface of the support substrate 210. Therefore, the third coil layer 313 may also have a structure including the conductive thin film 313A, the first metal layer 313B, and the second metal layer 313C.

In the case of a conventional thin-film coil component including four or more coil layers, internal coil layers, which are not disposed on an uppermost layer and are surrounded by an insulating layer and a supporting substrate, may be formed by performing only pattern plating, and thus, there is a limitation in increasing a total volume of a conductor (a coil). In the present embodiment, the second and third coil layers 312 and 313, internal coil layers, include first metal layers 312B and 313B, that are pattern plating layers, and second metal layers 312C and 313C, that are lead-in wire plating layers, respectively. Therefore, volumes of conductors of the internal coil layers may be increased, and thus, a total volume of conductors of the coil portion 300 in the body 100 of a limited size may also be increased. For this reason, component characteristics such as DC resistance Rdc of a component may be improved.

Each of the second and third coil layers 312 and 313 may have first and second bridge patterns B1 and B2. The bridge patterns B1 and B2 may be plating lead-in wires for plating the second and third metal layers 312B and 313B and 312C and 313C of the second and third coil layers 312 and 313, respectively. Thus, the bridge patterns B1 and B2 may have a shape connected to a plating lead-in wire, disposed between regions corresponding to individual components, in a state of a large-area substrate in which a plurality of coils are connected to each other, and may be cut off from another adjacent individual component in a dicing process of individualizing a plurality of coils and may be exposed to a surface of a body of an individual component. In the present embodiment, the first bridge pattern B1 may be in contact with and connected to the external end portion 312-1 of the second coil layer 312 and may extend to be exposed to the third surface 103 of the body 100, and the second bridge pattern B2 may be in contact with and connected to a region, adjacent to a side of the fourth surface 104 of the body 100, in an outermost turn of the third coil layer 313 extending from the external end portion 313-1 of the third coil layer 313 and may extend to be exposed to the fourth surface 104 of the body 100. As an example, when the bridge patterns B1 and B2 are exposed together to one surface of the body 100, plating current density may be dispersed during plating formation of the second metal layers 312C and 313C to increase plating time required for plating growth of the second metal layers 312C and 313C. In addition, plating current starts to be applied to both the second metal layer 312C of the second coil layer 312 and the second metal layer 313C of the third coil layer 313 from a region adjacent to one surface of the body 100, so that ultimate second metal layers 312C and 313C may have a shape in which a thickness is largest on a side of one surface of the body 100. As a result, the second and third coil layers 312 and 313 may be asymmetrical overall with respect to the core 110. In the present embodiment, since one of the bridge patterns B1 and B2 is exposed to one of the third and fourth surfaces 103 and 104 of the body 100 and the other bridge pattern is exposed to the other surface, the second metal layers 312C and 313C of the second and third coil layers 312 and 313 may be more easily and uniformly formed.

Each of the first to fourth coil layers 311, 312, 313, and 314 and the first to third vias 321, 322, and 323 may be formed of a conductive material such as copper (Cu), aluminum (Al), silver (Ag), tin (Sn), gold (Au), nickel (Ni), lead (Pb), titanium (Ti), molybdenum (Mo), or alloys thereof, but the present disclosure is not limited thereto.

The insulating layers 221 and 222 may be formed of an insulating material including at least one of a thermosetting insulating resin such as an epoxy resin, a thermoplastic insulating resin such as a polyimide resin, and a photosensitive insulating resin, or an insulating material in which a reinforcing material such as a glass fiber or an inorganic filler is impregnated with an insulating resin. As an example, the insulating layers 221 and 222 may include a film-type insulating material such as prepreg, Ajinomoto Build-up Film (ABF), a photoimageable dielectric (PID) film, or the like, but are not limited thereto. The insulating layers 221 and 222 may be formed by applying a liquid insulating resin and curing the applied liquid insulating resin.

The insulating layer IF may be disposed between the coil portion 300 and the body 100, and between the support substrate 210 and the body 100. The insulating layer IF may be formed along the surface of the support substrate 210 on which the first to fourth coil layers 311, 312, 313, and 314 and the insulating layers 221 and 222 are formed. The insulating layer IF may be provided to insulate the coil portion 300 and the body 100 from each other, and may include a known insulating material such as parylene, but is not limited thereto. As another example, the insulating layer IF may include an insulating material such as an epoxy resin, rather than parylene. The insulating layer IF may be formed by vapor deposition, but the present disclosure is not limited thereto. As another example, the insulating layer IF may be formed by laminating an insulation film for forming an insulating layer IF on both surfaces of the support substrate 210, on which the coil portion 300 and the insulating layers 221 and 222 are formed, and curing the laminated insulating film. Alternatively, the insulating layer IF may be formed by applying an insulating paste for forming an insulating layer IF on both surfaces of the support substrate 210, on which the coil portion 300 and the insulating layers 221 and 222 are formed, and curing the applied insulating paste.

The external electrodes 400 and 500 may be disposed to be spaced apart from each other on the body 100 and may be connected to the coil portion 300. In the present embodiment, the external electrodes 400 and 500 include first layers 410 and 510 and second layers 420 and 520 disposed on at least a portion of the first layers 410 and 510. The first layers 410 and 510 of the external electrodes 400 and 500 may include pad portions 412 and 512, spaced apart from each other on the sixth surface 106 of the body 100, and connecting portions 411 and 511, respectively disposed on the first and second surfaces 101 and 102 of the body 100. Specifically, the first layer 410 of the first external electrode 400 may include a first connection portion 411, disposed on the first surface 101 of the body 100 to be in contact with the external end portion 311-1 of the first coil layer 311 exposed to the first surface 101 of the body 100, and a first pad portion 412 extending from the first connection portion 411 to the sixth surface 106 of the body 100. The first layer 510 of the second external electrode 500 may include a second connection portion 511, disposed on the second surface 102 of the body 100 to be in contact with the external end portion 314-1 of the fourth coil layer 314 exposed to the second surface 102 of the body 100, and a second pad portion 512 extending from the second connection portion 511 to the sixth surface 106 of the body 100. The first and second pad portions 412 and 512 may be disposed to be spaced apart from each other on the sixth surface 106 of the body 100. The connection portions 411 and 511 and the pad portions 412 and 512 may be formed together in the same process to be integrated with each other without forming a boundary therebetween, but the present disclosure is not limited thereto.

The first layers 410 and 510 may be formed by vapor deposition, such as sputtering, or plating. Alternatively, the first layers 410 and 510 may be formed by applying a conductive paste, including conductive powder including at least one of copper (Cu) and silver (Ag) and an insulating resin, and curing the applied conductive paste. As an example, each of the first layers 410 and 510 may be a copper (Cu) plating layer, but the present disclosure is not limited thereto.

The second layers 420 and 520 may be disposed on at least a portion of the first layers 410 and 510. The second layers 420 and 520 may be formed by vapor deposition, such as sputtering, or plating. As an example, each of the second layers 420 and 520 may be formed to have a structure of two or more layers including a nickel (Ni) plating layer and a tin (Sn) plating layer, but the present disclosure is not limited thereto. In FIG. 3, the second layers 420 and 520 are illustrated as being disposed on only the pad portions 412 and 512. However, since this is only an example, the present disclosure is not limited thereto.

Each of the external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or alloys thereof, but the present disclosure is not limited thereto.

In FIG. 1, each of the first layers 410 and 510 of the external electrodes 400 and 500 is illustrated as having an 'L' shape. However, this is only an example, and an overall shape of each of the first layers 410 and 510 and, further, an overall shape of each of the external electrodes 400 and 500 may be appropriately changed into a '[' shape, or the like.

The surface insulating layers 610 and 620 may surround a surface of the body 100, except for a region in which the external electrodes 400 and 500 are formed, among the first to sixth surfaces 101, 102, 103, 104, 105, and 106. The surface insulating layers 610 and 620 may be formed to have a multilayer structure. In the present embodiment, the surface insulating layers 610 and 620 may include a first surface insulating layer 610, disposed in a region, except for a region in which the first layers 410 and 510 of the external electrodes 400 and 500 are to be formed, among the first to sixth surfaces 101, 102, 103, 104, 105, and 106, and a second surface insulating layer 620 disposed on the connection portions 411 and 511 of the first layers 410 and 510 to cover the connection portions 411 and 511. The second surface insulating layer 620 may be formed to be integrated with each other on the first to fifth surfaces 101, 102, 103, 104 and 105 of the body 100, but the present disclosure is not limited thereto. The surface insulating layers 610 and 620 may serve as a plating resist during plating formation of the external electrodes 400 and 500, but the present disclosure is not limited thereto.

Each of the surface insulating layers 610 and 620 may include a thermoplastic resin such as a polystyrene-based resin, a vinyl-acetate-based resin, a polyester-based resin, a polyethylene-based resin, a polypropylene-based resin, a polyamide-based resin, a rubber-based resin, or an acrylic-based resin, a thermosetting resin such as a phenol-based resin, an epoxy-based resin, a urethane-based resin, a melamine-based resin, or an alkyd-based resin, a photosensitive resin, parylene, $SiO_x$, or $SiN_x$.

Each of the surface insulating layers 610 and 620 may have an adhesive function. For example, when the first surface insulating layer 610 is formed of an insulating film, the insulating film may include an adhesive component to adhere to the surface of the body 100. In this case, an additional adhesive layer may be formed on one surface of the first surface insulating layer 610. However, an additional adhesive layer may not be formed on one surface of the surface insulating layers 610 and 620 when the surface insulating layers 610 and 620 are formed using an insulating film in a semi-cured state (α-stage).

The surface insulating layers 610 and 620 may be formed by applying a liquid insulating resin to the surface of the body 100, laminating an insulating film on the surface of the body 100, or forming an insulating resin on the surface of the body 100 using vapor deposition. The insulating film may be a dry film (DF) including a photosensitive insulating resin, an Ajinomoto Build-up Film (ABF), or a polyimide film, not including a photosensitive insulating resin.

A total thickness of the surface insulating layers 610 and 620 may be within range of 10 nm to 100 μm. When the thicknesses of the surface insulating layers 610 and 620 are less than 10 nm, characteristics of coil components, such as a Q factor, a breakdown voltage, a self-resonant frequency (SRF), and the like, may be decreased. In addition, when the thicknesses of the surface insulating layers 610 and 620 are greater than 100 μm, total length, width, and thickness of the coil component may be increased, resulting in a disadvantage for thinning.

Heretofore, a description has been provided under the assumption that the coil portion 300 includes four coil layers 311, 312, 313, and 314. However, this is only an example and a case, in which the coil portion 300 includes five or more coil layers, may fall within the scope of the present embodiment. As an example, when the coil portion 300 includes six coil layers, internal end portions of respective first and second coil layers may be connected by a first via, external end portions of respective second and third coil layers may be connected by a second via, internal end portions of respective third and fourth coil layers may be connected by a third via, external end portions of respective fourth and fifth coil layers may be connected by a fourth via, and internal end portions of respective fifth and sixth coil layers may be connected by a fifth via. The external end portions of the respective first and sixth coil layers may be exposed to the surface of the body 100 to be in contact with the first and second external electrodes. The third via may penetrate through the support substrate to connect the third and fourth coil layers to each other. Each of the first, second, fourth, and fifth vias may penetrate through the insulating layer disposed on the support substrate.

As described above, in a coil component including a plurality of coil layers, a total volume of the coil layers, conductors, may be increased.

While exemplary embodiments have been shown and described above, it will be apparent to those skilled in the art that modifications and variations could be made without departing from the scope of the present disclosure as defined by the appended claims.

What is claimed is:

1. A coil component comprising:

a body;

a support substrate disposed in the body;

a coil portion disposed on the support substrate and comprising first, second, third and fourth coil layers spaced apart from each other; and a first external electrode and a second external electrode disposed to be spaced apart from each other on the body and connected to the first and fourth coil layers, respectively, wherein each of the second and third coil layers comprises a first metal layer, disposed on the support substrate, and a second metal layer disposed on the first metal layer to cover a side surface of the first metal layer and to be in contact with the support substrate, the second coil layer has a first bridge pattern exposed to a first side surface of two side surfaces, opposing each other, of the body, the third coil layer has a second bridge pattern exposed to a second side surface of the two side surfaces of the body, each of the second and third coil layers further comprises via pads disposed on an internal end portion and an external end portion, and the first bridge pattern is in contact with and connected to the via pad disposed on the external end portion of the second coil layer.

2. The coil component of claim 1, wherein the second bridge pattern is in contact with and connected to an outermost turn of the third coil layer connected to the via pad disposed on the external end portion of the third coil layer.

3. The coil component of claim 1, wherein a thickness of a region of the second metal layer, disposed on an upper surface of the first metal layer, is substantially the same as a thickness of a region of the second metal layer disposed on a side surface of the first metal layer.

4. The coil component of claim 1, wherein a thickness of a region of the second metal layer, disposed on an upper surface of the first metal layer, is greater than a thickness of a region of the second metal layer disposed on a side surface of the first metal layer.

5. The coil component of claim 1, wherein each of the second and third coil layers further comprises a conductive film disposed between the support substrate and the first metal layer.

6. The coil component of claim 5, wherein the first metal layer is spaced apart from the support substrate by exposing a side surface of the conductive film.

7. The coil component of claim 1, wherein the second and third coil layers are disposed to be in contact with a first surface and a second surface, opposing each other, of the support substrate, respectively, the first and fourth coil layers are disposed to be spaced apart from the first surface and the second surface of the support substrate, respectively, and the coil component further comprises first and second insulating layers disposed between the first surface of the support substrate and the first coil layer and between the second surface of the support substrate and the fourth coil layer, respectively.

8. The coil component of claim 7, wherein each of the first and fourth coil layers comprises a third metal layer, disposed on a respective one of the first and second insulating layers, and a fourth metal layer disposed on the third metal layer to cover a side surface of the third metal layer and to be in contact with the respective one of the first and second insulating layers.

9. The coil component of claim 7, wherein the first coil layer comprises an external end portion exposed to a first end surface of two end surfaces of the body connecting the two side surfaces of the body to each other, and the fourth coil layer comprises an external end portion exposed to a second end surface of the two end surfaces of the body.

10. A coil component comprising:

a body comprising first and second surfaces opposing each other in a length direction, third and fourth surfaces connecting the first and second surfaces and opposing each other in a width direction, and fifth and sixth surfaces connecting the first to fourth surfaces and opposing each other in a thickness direction;

a support substrate disposed in the body;

a coil portion disposed on the support substrate and comprising first, second, third and fourth coil layers spaced apart from each other in the thickness direction; and a first external electrode and a second external electrode disposed to be spaced apart from each other on the body and connected to the first and fourth coil layers, respectively, wherein each of the second and third coil layers comprises multiple metal layers stacked on one another, external end portions of the first and fourth coil layers are exposed to the first and second surfaces of the body, respectively, in the length direction, the second coil layer has a first bridge pattern extending from an external end portion of the second coil layer, the first bridge pattern being exposed through the third surface of the body in the width direction, the third coil layer has a second bridge pattern extending from an external end portion of the third coil layer, the second bridge pattern being exposed through the fourth surface of the body in the width direction, the second and third coil layers are disposed on first and second surfaces, opposing each other, of the support substrate, the first and fourth coil layers are disposed on the second and third coil layers, respectively, and first and second insulating layers are disposed on the first and second surfaces of the support substrate and cover the second and third coil layers, respectively.

11. The coil component of claim 10, wherein each of the second and third coil layers comprises a first metal layer, disposed on the support substrate, and a second metal layer disposed on the first metal layer to cover a side surface of the first metal layer and to be in contact with the support substrate.

12. The coil component of claim 11, wherein each of the first and fourth coil layers comprises a third metal layer, disposed on the first and second insulating layers, and a fourth metal layer to cover a side surface of the third metal layer and to be in contact with the first and second insulating layers, respectively.

13. The coil component of claim 12, wherein a thickness of a region of the second metal layer, disposed on an upper surface of the first metal layer, is substantially the same as a thickness of a region of the second metal layer disposed on a side surface of the first metal layer, and a thickness of a region of the fourth metal layer, disposed on an upper surface of the third metal layer, is substantially the same as a thickness of a region of the fourth metal layer disposed on a side surface of the third metal layer.

14. The coil component of claim 12, wherein a thickness of a region of the second metal layer, disposed on an upper surface of the first metal layer, is greater than a thickness of a region of the second metal layer disposed on a side surface of the first metal layer, and a thickness of a region of the fourth metal layer, disposed on an upper surface of the third metal layer, is greater than a thickness of a region of the fourth metal layer disposed on a side surface of the third metal layer.

15. The coil component of claim 12, wherein each of the second and third coil layers further comprises a conductive film disposed between the support substrate and the first metal layer, and each of the first and fourth coil layers further comprises a conductive film disposed to be in contact with the first or second insulating layer and disposed between one of the first or second insulating layer and the third metal layer, respectively.

16. The coil component of claim 10, further comprising a third insulating layer disposed between the coil portion and the body, and disposed between the support substrate and the body, wherein a portion of the third insulating layer is disposed between adjacent turns of the first or fourth coil layer.

17. A coil component comprising:

a body;

a support substrate disposed in the body;

a coil portion disposed on the support substrate and comprising first, second, third and fourth coil layers spaced apart from each other; and a first external electrode and a second external electrode disposed to be spaced apart from each other on the body and connected to the first and fourth coil layers, respectively, wherein each of the second and third coil layers comprises a first metal layer, disposed on the support substrate, and a second metal layer disposed on the first metal layer to cover a side surface of the first metal layer and to be in contact with the support substrate, the second coil layer has a first bridge pattern exposed to a first side surface of two side surfaces, opposing each other, of the body, the third coil layer has a second bridge pattern exposed to a second side surface of the two side surfaces of the body, each of the second and third coil layers further comprises a conductive film disposed between the support substrate and the first metal layer, and the first metal layer is spaced apart from the support substrate by exposing a side surface of the conductive film.

* * * * *